Figure 1:
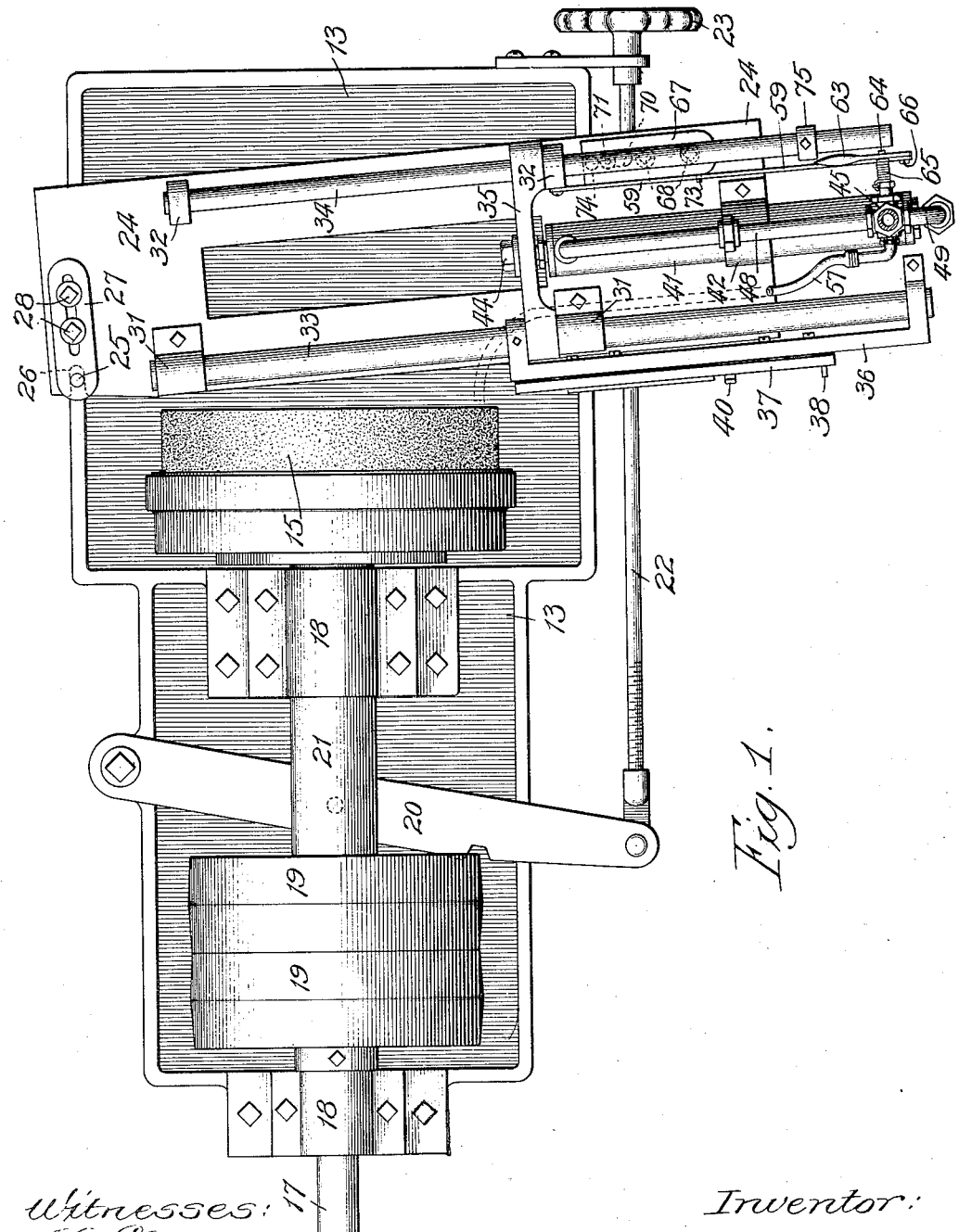

No. 880,120. PATENTED FEB. 25, 1908.
J. G. BLESSING.
GRINDING MACHINE.
APPLICATION FILED APR. 17, 1906.

6 SHEETS—SHEET 1.

Witnesses:
Inventor:
John G. Blessing,
By Dyrenforth, Dyrenforth & Lee,
Attys.

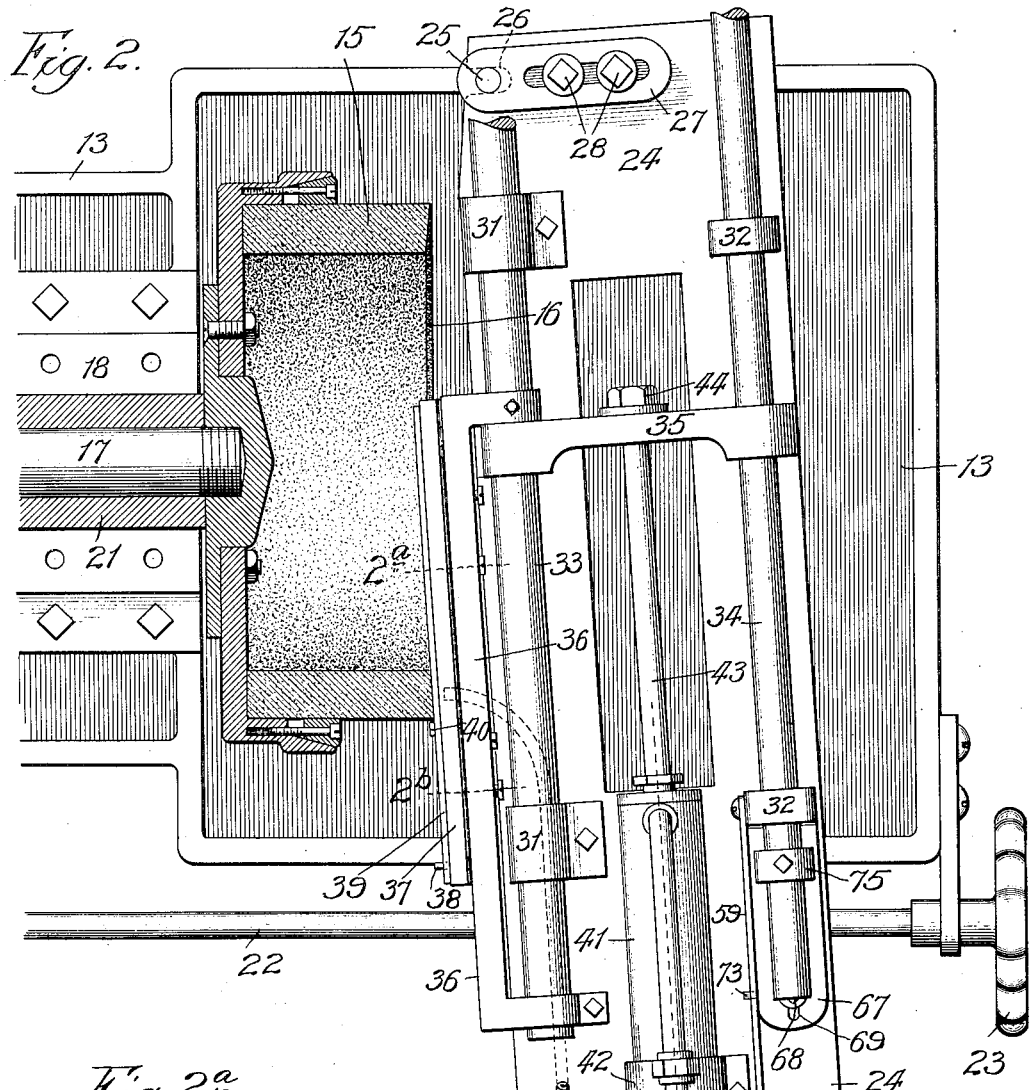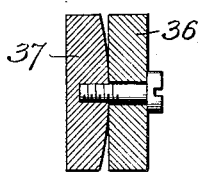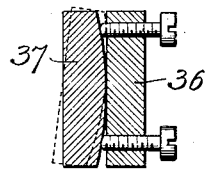

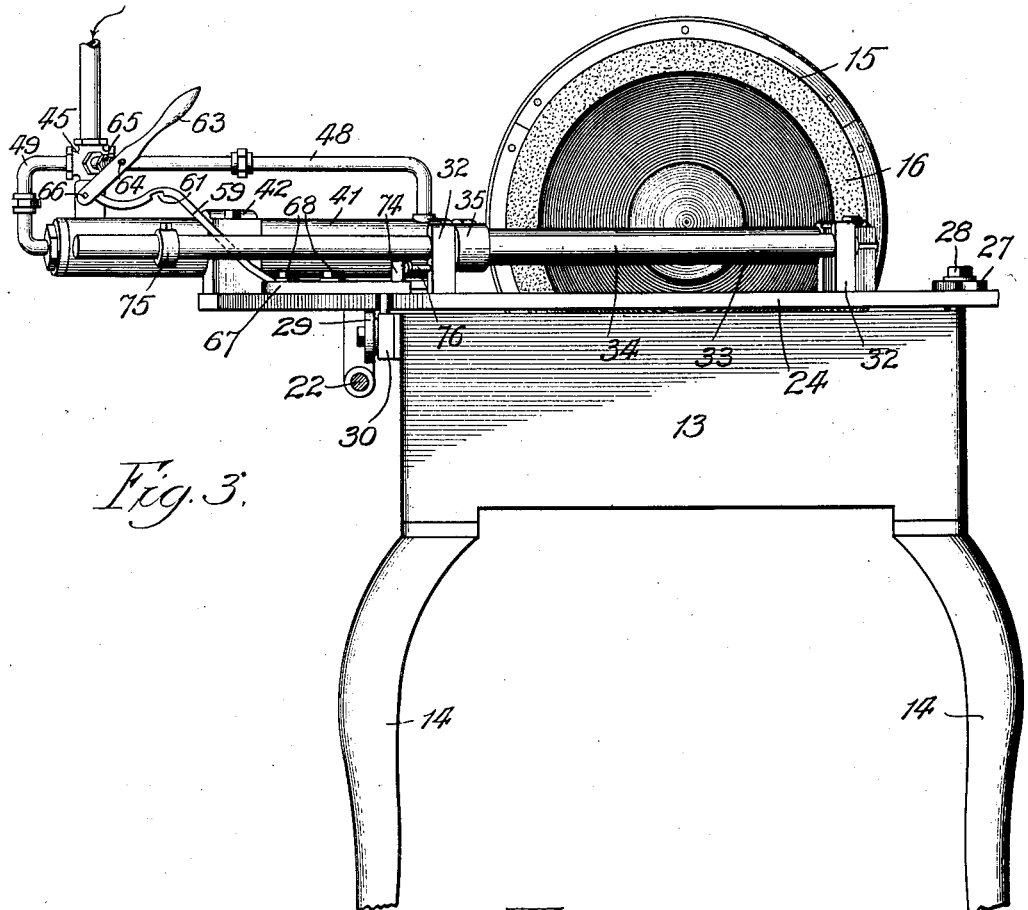
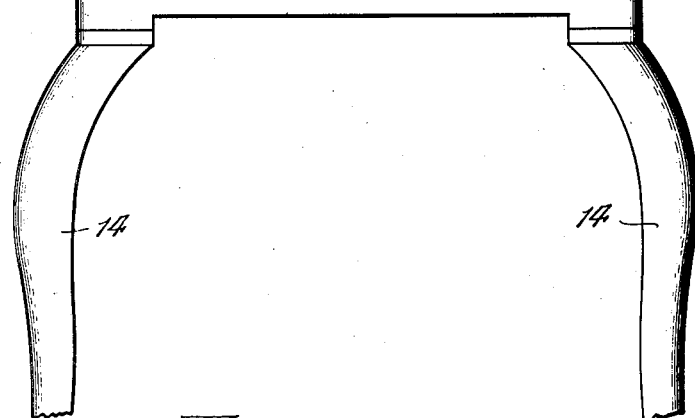
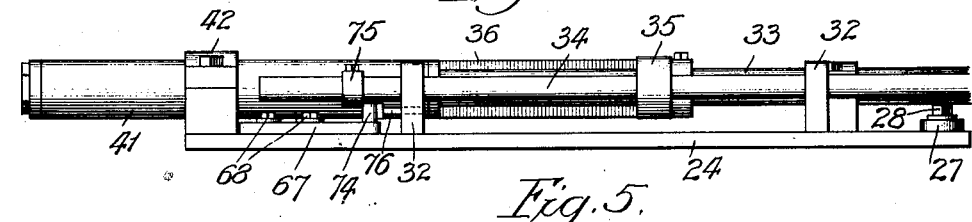

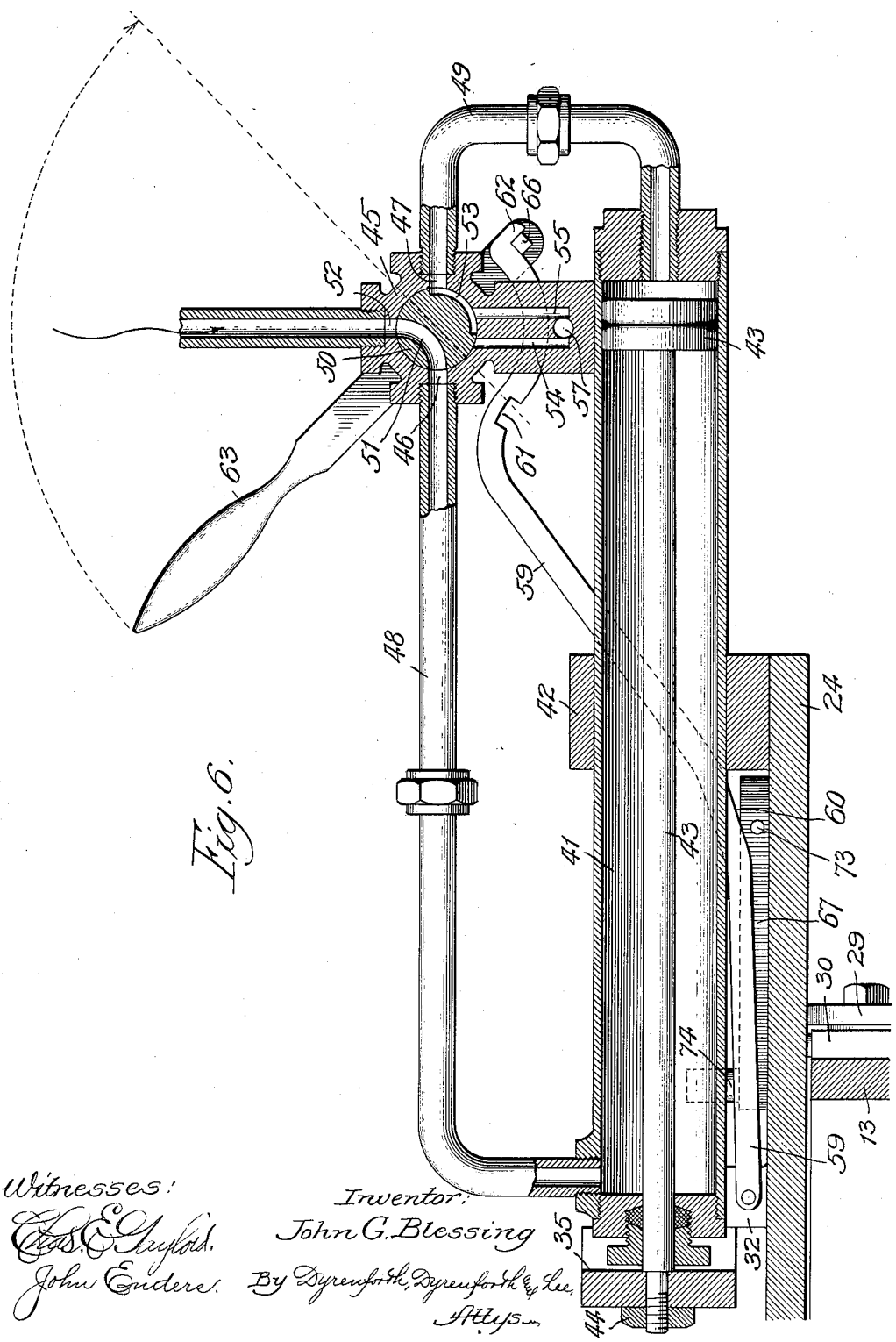

No. 880,120. PATENTED FEB. 25, 1908.
J. G. BLESSING.
GRINDING MACHINE.
APPLICATION FILED APR. 17, 1906.
6 SHEETS—SHEET 5.
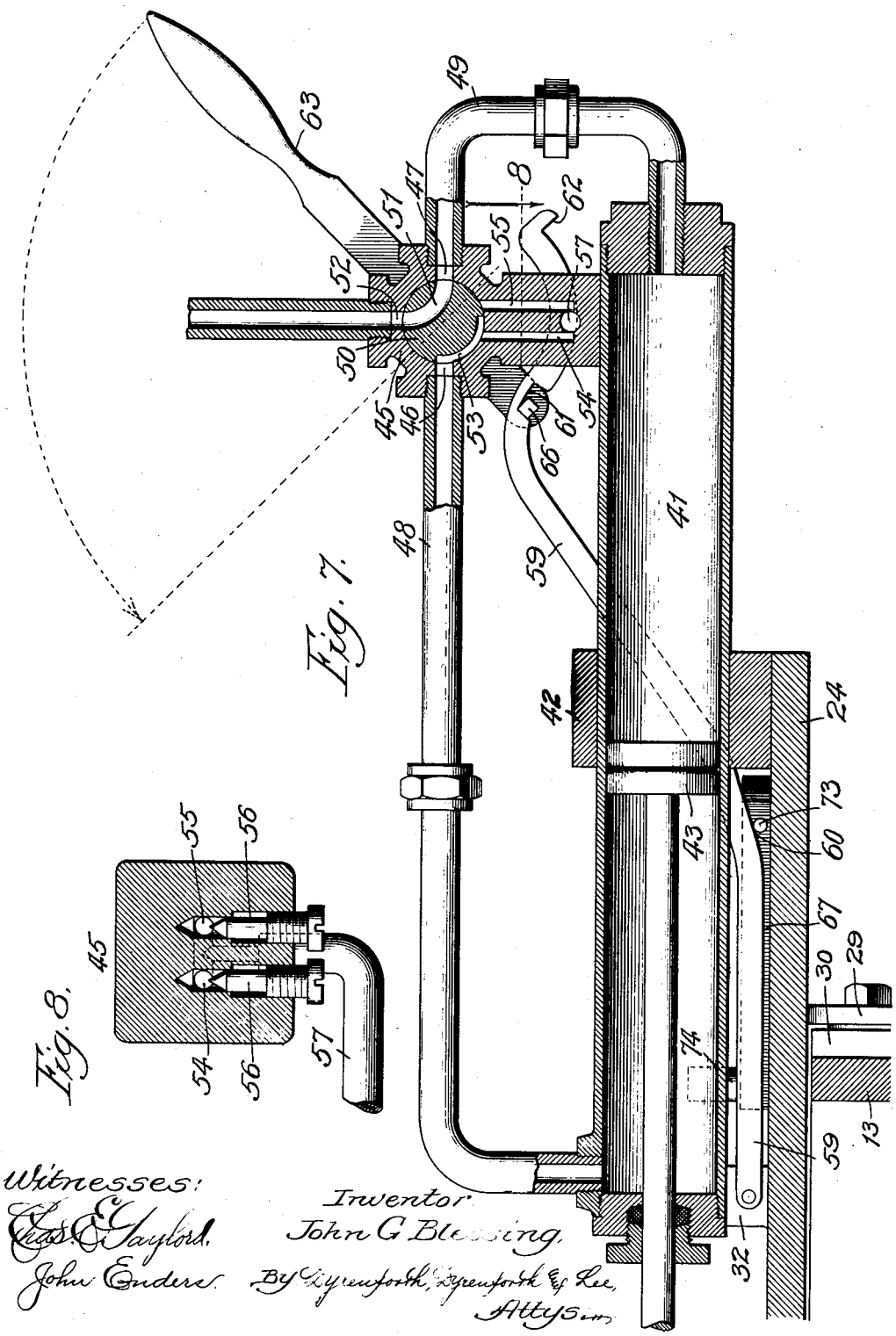

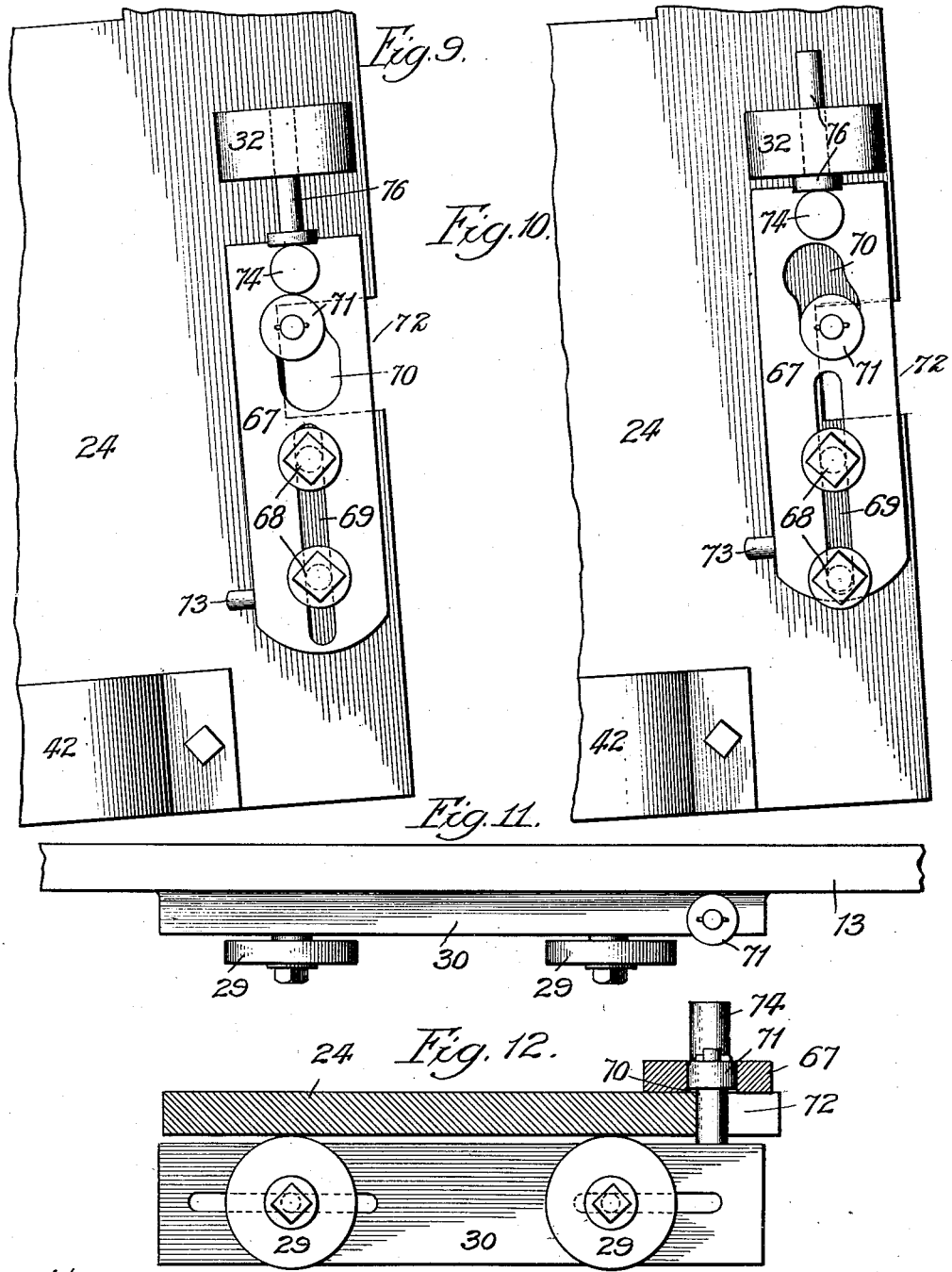

UNITED STATES PATENT OFFICE.

JOHN G. BLESSING, OF CHICAGO, ILLINOIS, ASSIGNOR TO AMERICAN CUTLERY COMPANY, OF CHICAGO, ILLINOIS.

GRINDING-MACHINE.

No. 880,120.  Specification of Letters Patent.  Patented Feb. 25, 1908.

Application filed April 17, 1906. Serial No. 312,112.

*To all whom it may concern:*

Be it known that I, JOHN G. BLESSING, a citizen of the United States, residing at Chicago, in the county of Cook and State of Illinois, have invented a new and useful Improvement in Grinding-Machines, of which the following is a specification.

My invention relates to improvement in the class of machines for grinding cutlery, such as knife-blades or the like, in which a reciprocating work-carrier or holder is employed for moving the article to be ground against the grinding surface of a grinding-wheel.

One of my objects is to provide a machine of the class referred to, whereby the parts which are subjected to greatest wear may be readily removed and replaced with slight expense; and other objects are to provide a comparatively simple construction of such a machine and to render it positive in operation, thereby insuring uniform grinding.

My invention is illustrated in the accompanying drawings, in which—

Figure 1 is a top plan view of my improved grinding-machine illustrating the position of the parts when the work-carrier is in its normal withdrawn position preparatory to operating the machine; Fig. 2, an enlarged partly broken top plan view of the same, showing the position of the parts when the work-carrier is at the limit of its forward or inward movement, the grinding-wheel and its shaft being shown in horizontal central section; Figs. 2ª and 2ᵇ, sections of the work-carrier taken on lines 2ª and 2ᵇ in Fig. 2; Fig. 3, a view of the machine in end elevation, the parts being in the relative positions represented in Fig. 1; Fig. 4, an enlarged broken view in side elevation of the bed, and movable parts thereon for reciprocating the work-carrier and oscillating the bed; the parts being shown in their positions immediately preceding the oscillation of the bed; Fig. 5, a view similar to Fig. 4, showing the relative positions of the parts at the limit of oscillation of the bed in the direction for producing the grinding; Fig. 6, an enlarged partly sectional view on line 6 in Fig. 2, showing a cylinder and piston mechanism for reciprocating the work-holder, and a plug-valve as it appears when the parts are in their normal relative positions shown in Fig. 1; Fig. 7, a similar view showing the positions of the parts and the relative positions they assume when the machine is operating to move the work-carrier inward, the piston being represented at the middle of its forward stroke; Fig. 8, an enlarged view in horizontal section taken at the line 8 on Fig. 7 and viewed in the direction of the arrow, showing the needle-valves for the fluid-exhaust passages; Fig. 9, an enlarged broken top plan view of a portion of the bed, showing cam-mechanism thereon for oscillating the bed and the relative positions of parts at the end of the return-movement of the work-carrier; Fig. 10, a view similar to Fig. 9, showing the relative positions of the parts during the return movement of the work-carrier; Fig. 11, an enlarged broken plan view of a bar carrying rollers for supporting the free end of the bed, and showing a roller for engaging the cam; and Fig. 12, a view in elevation of the roller-carrying bar showing the bed in vertical section resting on the rollers and the cam roller in the cam-plate.

13 is the base of the machine in the form preferably of an open-top receptacle for holding water and supported on legs 14, 14. A grinding-wheel 15 is provided preferably in the form of a hollow cylinder with an inwardly tapering grinding surface at 16. The wheel 15 is secured on the end of a horizontal shaft 17 journaled in bearings 18, 18 secured to the casing, and extends into the receptacle 13. This wheel is adapted to be operated independently of the other mechanisms hereinafter described, as by means of a belt (not shown) on pulleys 19 upon the shaft 17. An arm 20 is pivoted at one end to the base 13, at its center to a non-rotary sleeve 21, confined against independent longitudinal movement on the shaft, and at its other end to a link having threaded connection with a screw or shaft 22 journaled in the front side of the base and operated by a hand-wheel 23 for moving the shaft carrying the grinding-wheel longitudinally in the shaft-bearings to compensate for wear on the grinding-surface of the wheel. A horizontal bed-plate 24, for carrying the reciprocating parts hereinafter described, is pivoted at its rear end to the base 13, as by a stud 25 rising from the latter through the slot 26 in the bed-plate, the stud being journaled in a socket in a plate 27, adjustably secured to the bed by bolts 28, to adapt the bed to be oscillated horizontally. The bed is supported near its free end on rollers 29 journaled on a bar 30 secured to the front side of the base. Bearing-blocks 31, 32 rise from the bed 24 to afford guiding-supports for parallel rods 33, 34, respectively, the rods carrying a cross-head 35 uniting them near their transverse centers.

36 is a work-holder carrier of the preferred U-shape illustrated, rigidly secured at its flanged ends to the rod 33, to extend parallel with the latter along its outer side and adapt it to be reciprocated with the rods 33, 34 for carrying across the grinding surface of the wheel the article to be ground. Forming a part of the carrier is a work holder or bar 37 fastened in place as shown in Fig. 2ª, and capable of adjustment to different angles as indicated in Fig. 2ᵇ. The bar 37 is provided with a lug 38 near its forward end, for engaging the usual eye in the butt-end of a knife-blade blank 39, and beyond the lug 38 with a hook 40 forming a retaining seat for the blade 39 near its transverse center for releasably holding the blade against the flat surface of the bar 37 in position for grinding. The bar 37 may be adjusted by means of the set screws shown in Fig. 2ᵇ to present the blade at the desired angle to the grinding wheel 15.

The adjusting plate 27 may be moved in either direction to change the pivot 25 with relation to the plate 24, whereby the bar 37 may extend parallel with the grinding face 16, as shown in Fig. 2 or at an angle thereto during the grinding operation. Thus while in the position shown the blade 39 would be flat-ground, it could be hollow-ground, by positioning the bed-plate 24 more to the right on the plate 27, to present the blade to the outer edge of the grinding-wheel, or ground with a convex surface by positioning the plate 24 more to the left on the plate 27 to present the blade to the inner edge of the grinding-wheel. Adjustment of the bar 37 will regulate the transverse taper of the blade, and the bar 37 is also capable of adjustment to regulate the longitudinal taper of the blade.

The means for reciprocating the work-carrier comprises a horizontally mounted cylinder 41 rigidly secured to the bed 24, as by a strap 42, a piston 43 in the cylinder and secured to the cross-head 35, as by a nut 44, and mechanism actuated by either air, gas, steam or water, preferably the latter, for operating the piston, the following being a description of the said mechanism: A valve-casing 45 is mounted on the top of the cylinder and provided with ports 46 and 47 communicating with pipes 48 and 49, which lead, respectively, into the opposite ends of the cylinder. A plug-valve 50 in the casing is provided with an arc-shaped passage 51 adapted to alternately connect a port 52 leading from a suitable source of water supply (not shown) with the ports 46 and 47, for alternately introducing water under pressure into the cylinder at its opposite ends. The view in Fig. 7 represents the position of the valve adapted to admit water into the cylinder at the operating end of the machine, the converse being illustrated in Fig. 6. An arc-shaped recess 53 in the valve 50 connects the ports 46 and 47 with passages 54 and 55, respectively, in the casing, for the discharge of the water through the valve from the end of the cylinder opposite to that being supplied with water. The passages 54 and 55 are each provided with a needle-valve 56 for regulating the discharge of water through them, and, consequently, the speed of travel of the piston, the passages 54 and 55 opening below the needle-valves into an exhaust-pipe 57, which discharges the spent water. The pipe 57 may be flexible and caused to discharge the water against the face 16 of the grinding wheel, as indicated. 59 is an arm extending adjacent to the cylinder 41, being pivoted at its rear end to the rear block 32. The portion of the arm adjacent to its pivotal connection is straight and has a cam-surface 60. The forward end of the arm is provided with a double curve, as shown, and contains in its under surface, near its outer end, a recess 61 and has formed upon its outer end a depending shoulder or stop 62. An operating lever 63 is keyed to the stem 64 of the plug-valve 50. A spring 65 encircles the valve-stem 64, having one of its ends fastened to the casing 45 and its opposite end to the lever 63. The spring tends to turn the lever 63 backward to the position shown in Figs. 2 and 6, in which position it is releasably locked by engagement of a lug 66 thereon with the stop 62 on the arm. In this position of the lever the valve is turned to admit water into the end of the cylinder furthest from the operating end of the machine (as shown in Fig. 6).

The grinding of a blade 39 is performed for the most part during the movement of the reciprocating work carrier in one direction, that is to say the downward direction in Fig. 1, and in the movement of the carrier in the opposite direction the blade is held out of contact with the grinding wheel during the greater part of its traverse in that direction.

The means for raising the arm 59 to release the operating lever 63 and reverse the movement of the piston and return the work-carrier, with the blade 39 in contact with the grinding wheel, is carried by the mechanism for oscillating the bed and comprises the following parts: A plate 67 is slidably secured on the bed below the rod 34, by bolts 68 passing through a guide-slot 69 in the plate, to slide parallel with the said rod, and is provided with a double-faced cam-slot 70 as shown in Figs. 9 and 10. A roller 71, forming an abutment, is journaled on the upper side of the bar 30 and extends through a slot 72, in the side edge of the bed 24 and into the cam-slot 70 to actuate the plate 67, as hereinafter described. This cam-plate 67 carries a lateral stud 73 on its inner edge in the path of the arm 59, which is adapted to engage the said arm and raise it out of engagement with the stud 66 on the operating-lever, as hereinafter described. A vertical stud 74 is provided on the rear top side of the plate 67 and is adapted to be engaged by an adjustable collar or tappet 75 on the forward end of the rod 34 at the end of its inward or forward stroke; and a headed pin 76 is slidably secured in the block 32 in the path of the stud 74 to adapt it to be engaged by the cross-head 35 at the end of the return stroke of the piston to move the pin in its bearing to strike the stud 74, and thus shift the cam-plate longitudinally and cause the bed to be swung, by the engagement of the roller 71 with the cam slot, on its pivot 25, to move the work holder laterally in the direction away from the grinding wheel.

The operation of the machine is at follows: Assuming the machine to be in normal inactive condition, as shown in Figs. 1 and 3 and the grinding-wheel in motion, the blade 39, or other article to be ground, is inserted in the work-holder, as described, and the lever 63 then thrown, against the tension of the spring 65, to the position indicated in Fig. 7. This causes the lug 66 to engage the recess 61 in the arm 59 and hold the lever in this position until automatically released. In this position of the lever the passage 51 of the plug valve communicates with the ports 47 and 52, thereby admitting water under pressure into the adjacent end of the cylinder 41, which causes the piston 43, cross-head 35, rods 33, 34 and work-carrier 36 to be moved inwardly or forwardly. During the greater part of this movement of the parts, the cam-plate remains in the position indicated in Fig. 9 holding the blade 39 out of contact with the grinding wheel, and as they near the end of their traverse in this direction the cam-plate is shifted to the position indicated in Fig. 10 by engagement of the collar 75 with the stud 74, thereby oscillating the bed on its pivotal connection 25 and moving the work-holder sufficiently close to the grinding wheel to bring the blade 39 into the path of its grinding surface. Thus shifting the cam-plate causes the stud 73 to engage the cam-surface 60 of the arm 59, thereby raising it sufficiently to allow the lug 66 on the lever to be disengaged from the recess 61 and be automatically returned, with the valve, by action of the spring, to their normal positions illustrated in Fig. 6, in which the lever is engaged by the stop 62. In this position of the valve, its passage 51 connects the ports 46 and 52 to cause water to be introduced into the opposite end of the cylinder thereby forcing the piston back and with it the rods 33, 34, cross-head 35 and work-carrier 36, the cam-plate remaining in the position indicated in Fig. 10 until near the end of the return-stroke of the piston, when it is shifted by engagement of the stud with the head of the pin 76. The water from the end of the cylinder nearest the lever-equipped end of the machine, during the return-movement of the piston, passes through the pipe 49 to the passage 53 and thence through the passage 55 to the pipe 57 from which it is discharged against the grinding wheel. Thus in the operation of the machine as described, the grinding of the article supported in the work-holder takes place during the final movement of the carrier in its instroke and during the entire return stroke thereof. My invention is not, however, to be limited to such a construction, as certain features of my invention may be incorporated in a machine where the grinding is performed during both the entire inward as well as return movements of the work-carrier. By mounting the work-holder on rods adapted to be reciprocated in guides, the wear on the machine is mainly on the rods and guides, which may be readily removed and replaced without material delay and expense.

It will be understood that when an article 39 is placed in the work-holder and the lever 63 turned to the position shown in Fig. 7, the work-holder moves first in the inward direction, then in the outward direction and stops, to permit the article to be removed and replaced with another. As the article nears the end of its movement in the inward direction, stated, it is forced against the grinding wheel and the initial grinding thus effected in the final inward movement. The grinding continues during the movement of the article in the outward direction.

The function of the valves 56 is to control the escape of water from the cylinder, and by this means the speed of movement of the piston and attendant parts may be controlled.

What I claim as new and desire to secure by Letters Patent is—

1. In a grinding-machine, the combination with a base and a grinding-wheel journaled thereon, of a bed on said base provided with guide-bearings, rods secured together and reciprocably mounted in said bearings, a work-holder secured to one of said rods to reciprocate therewith and move the work to be ground against the grinding-surface of said wheel, and means for reciprocating said rods.

2. In a grinding-machine, the combination with a base and a grinding-wheel mounted thereon, of a bed on the base, a reciprocating work-holder on the bed for moving the work to be ground against the grinding-surface of the wheel, a cylinder on the bed, a piston in said cylinder directly connected with said carrier for actuating the latter, and means for actuating the piston, for the purpose set forth.

3. In a grinding-machine, the combination with a base and a grinding-wheel mounted thereon, of a bed mounted on said base and provided with guides, a rod reciprocably confined in said guides, a work-holder connected with said rod, a cylinder on said bed, a piston in said cylinder and connected with said rod to reciprocate it and the work-holder, and means for actuating the piston.

4. In a grinding-machine, the combination with a base and a grinding-wheel mounted thereon, of a bed mounted on said base and provided with guides, rods reciprocably confined in said guides, a cross-head secured to said rods, a work-holder connected with said rods, a cylinder on said bed, a piston in said cylinder and connected with said rods to reciprocate them and the work-holder, and means for actuating the piston.

5. In a grinding-machine, the combination with a base and a grinding-wheel journaled thereon, of a work-holder, a cylinder, a piston in said cylinder and connected with said work-holder for reciprocating the latter, and means for actuating the piston by fluid-pressure, comprising a valve for controlling the pressure-supply to said cylinder, a spring-controlled operating-lever for turning said valve, an arm adapted to engage said lever to releasably hold it against the tension of said spring, and means operated by the piston for engaging said arm to disengage the lever therefrom and cause it to return to normal position at the end of the inward stroke of the piston.

6. In a grinding-machine, the combination with a base and a grinding-wheel journaled thereon, of a bed provided with guides, a work-holder mounted on said guides, a cylinder, a piston in said cylinder and connected with said work-holder for reciprocating the latter, and means for operating the piston by fluid-pressure, comprising a valve for controlling the pressure-supply to said cylinder, a spring-controlled operating-lever for turning said valve, an arm provided with a cam and pivoted to the bed and adapted to engage said lever to releasably hold it against the tension of the spring, and means operated by the piston for engaging said cam to raise the arm and disengage the lever therefrom and cause it to return to normal position at the end of the inward stroke of the piston.

7. In a grinding-machine, the combination with a base and a grinding-wheel journaled thereon, of a bed provided with guides, rods reciprocably mounted on said guides, a work-holder on one of said rods, a cylinder, a piston in said cylinder and connected with said rods to reciprocate them, and means for operating the piston by fluid-pressure, comprising a valve for controlling the pressure-supply to said cylinder, a spring-controlled operating-lever for turning said valve, an arm provided with a cam and pivoted to the bed and adapted to engage said lever to releasably hold it against the tension of the spring, a tappet on one of the rods and means operated by said tappet for engaging said cam to raise the arm and disengage the lever therefrom and cause it to return to normal position at the end of the inward stroke of the piston.

8. In a grinding-machine, the combination with a base and a grinding-wheel journaled thereon, of a work-holder, a cylinder, a piston in said cylinder and connected with said work-holder for reciprocating the latter, and means for operating the piston by fluid-pressure, comprising a valve for controlling the pressure-supply to said cylinder, a spring-controlled operating-lever for turning said valve and provided with a stud, an arm pivoted at one end to a stationary part of the machine and provided with a cam-surface adjacent to its pivotal connection, a hook at the opposite end of the arm and a recess intermediate its hook and pivotal connection for engaging the lever-stud to releasably hold the lever against the tension of said spring, and means operated by the piston for engaging said cam to raise the arm and disengage the lever therefrom and cause it to return to normal position at the end of the inward stroke of the piston.

9. In a grinding-machine, the combination with a base and a grinding-wheel journaled thereon, of a bed pivoted at one end to the base, a work-holder, a cylinder, a piston in said cylinder and connected with said work-holder for reciprocating the latter, means for oscillating the bed, comprising an abutment on the base and a cam-plate slidably mounted on the bed and adapted to be moved at its cam-surface into engagement with said abutment at the end of the inward stroke of the piston, and means for actuating the piston by fluid-pressure, comprising a spring-controlled operating-lever for turning said valve, an arm provided with a cam and pivoted to the bed and adapted to engage said lever to releasably hold it against the tension of the spring, and means on said cam-plate for engaging the cam on the arm to raise the latter and disengage the lever therefrom and cause it to return to normal position at the end of the inward stroke of the piston.

10. In a grinding-machine, the combination with a base and a grinding-wheel journaled thereon, of a work-holder, a cylinder, a piston in said cylinder connected with said work-holder for reciprocating the latter, and means for actuating the piston by fluid-pressure, comprising a valve for controlling the pressure-supply to said cylinder, needle-valves in the exhaust-passages of said valve for controlling the exhaust, and means for automatically operating the valve to reverse the pressure at the end of the forward piston-stroke.

11. In a grinding-machine, the combination with a base and a grinding-wheel mounted thereon, of a bed pivoted at one end to the base, a work-holder reciprocably mounted on said bed means for reciprocating said work-holder, and means for oscillating the bed, comprising an abutment on said base and a cam on said bed adapted to be moved into engagement with said abutment at the end of the inward movement of the work-carrier, for the purpose set forth.

12. In a grinding-machine, the combination with a base and a grinding-wheel mounted thereon, of a bed pivoted at one end to the base, a work-holder reciprocably mounted on said bed, means for reciprocating said work-holder, and means for oscillating the bed, comprising an abutment on said base, a cam on said bed, and an adjustable tappet movable with said work-holder and adapted to strike said cam and move the latter into engagement with said abutment at the end of the inward stroke of the piston, for the purpose set forth.

13. In a grinding-machine, the combination with a base and a grinding-wheel mounted thereon, of a bed pivoted at one end to the base and provided with bearing-guides, rods reciprocably mounted in said guides, a work-holder secured to one of said rods, means for reciprocating said rods, and means for oscillating the bed, comprising a roller on the base, a plate slidably mounted on the bed and provided with a cam-slot engaging said roller, and a tappet on one of said rods adapted to strike the cam-plate and oscillate the bed at the end of the inward stroke of the piston.

14. In a grinding-machine, the combination with a base and a grinding-wheel journaled thereon, of a bed pivoted at one end to the base, a work-holder reciprocably mounted on said bed, means for reciprocating the work-holder, and means for oscillating the bed, comprising an abutment on said base, a cam movable on said bed, tappets movable with said work-holder and adapted to engage said cam to move it in opposite directions against said abutment at the ends of the strokes of the piston.

15. In a grinding-machine, the combination with a base and a grinding-wheel journaled thereon, of a bed pivoted at one end to the base, a work-holder reciprocably mounted on said base, means for reciprocating the work-holder, and means for oscillating the bed, comprising an abutment on said base, a cam-plate slidably mounted on said bed and provided with a cam-slot and stud, a movable pin in the path of said stud, and tappets movable with said work-holder one of which is adapted to engage the stud at the end of the inward movement of the work-holder and thereby shift the cam and oscillate the bed, the other of said tappets adapted to engage the pin and move it against the stud at the end of the return movement of the work-holder, and thereby shift the cam and oscillate the bed to their normal positions.

16. In a grinding-machine, the combination with a base and a grinding-wheel journaled thereon, of a bed on the base, a reciprocable work-holder on the bed, a cylinder on the bed, a piston in said cylinder connected with the work-holder for reciprocating the latter, and means for actuating the piston by fluid-pressure, comprising a valve for controlling the pressure-supply to said cylinder, consisting of a valve-casing provided with a water-inlet-port, ports communicating with the opposite ends of said cylinder, and a water-exhaust port, and a valve-proper in said casing provided with a passage adapted to connect the water-inlet port in the casing with either of the ports communicating with the opposite ends of the cylinder, and with a passage for connecting the water-exhaust port of the casing with either of the ports communicating with the opposite ends of the cylinder.

JOHN G. BLESSING.

In the presence of—
  W. B. DAVIES,
  J. H. LANDES.